F. L. SPEELMAN.
MILK TICKET HOLDER AND PROTECTOR.
APPLICATION FILED NOV. 21, 1916.
1,224,031. Patented Apr. 24, 1917.
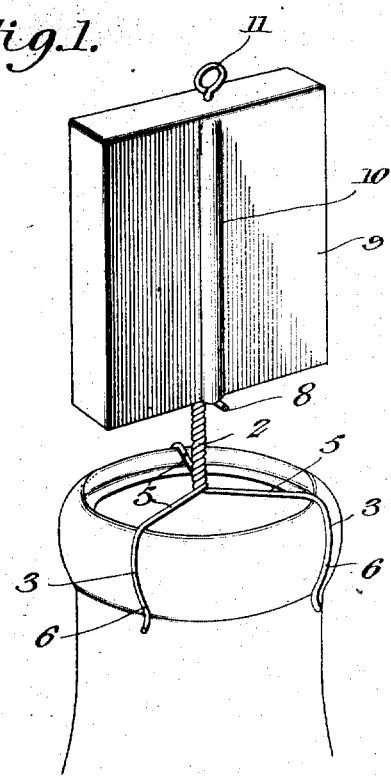
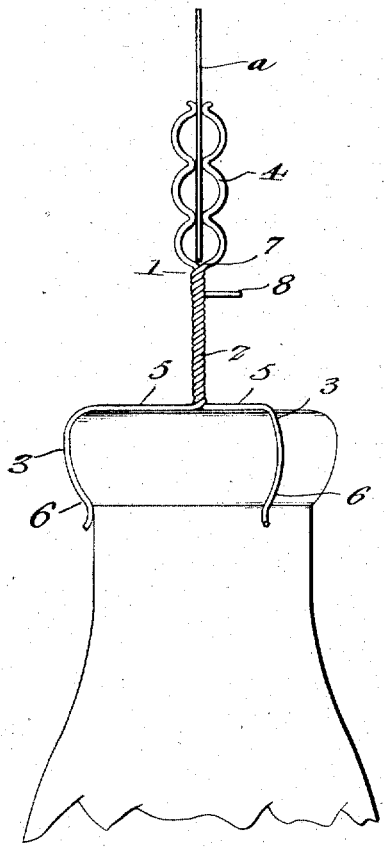
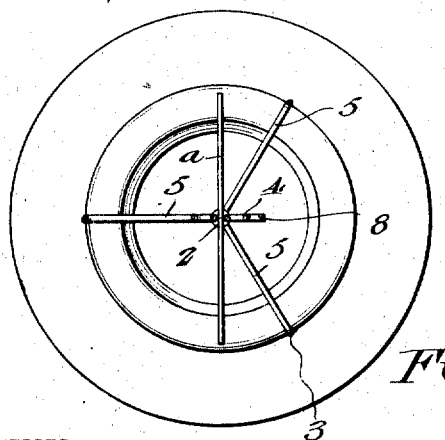
WITNESSES
INVENTOR
Frank L. Speelman.
BY Victor J. Evans
ATTORNEY

UNITED STATES PATENT OFFICE.

FRANK L. SPEELMAN, OF CRESTLINE, OHIO.

MILK-TICKET HOLDER AND PROTECTOR.

1,224,031.  Specification of Letters Patent.  Patented Apr. 24, 1917.

Application filed November 21, 1916. Serial No. 132,656.

*To all whom it may concern:*

Be it known that I, FRANK L. SPEELMAN, a citizen of the United States, residing at Crestline, in the county of Crawford and State of Ohio, have invented new and useful Improvements in Milk-Ticket Holders and Protectors, of which the following is a specification.

This invention is an improved device for use on a milk bottle to hold and protect a milk ticket, the object of the invention being to provide an improved device of this character which is cheap and simple in construction, is strong and durable, and which can be instantly attached to or removed from a milk bottle as desired.

In the accompanying drawings:

Figure 1 is a perspective view of a milk ticket holder and protector constructed and arranged in accordance with my invention, and showing the same in use on a milk bottle and with the protector in place on the holder.

Fig. 2 is an elevation of the same with the protector removed.

Fig. 3 is a sectional view of the same.

In the embodiment of my invention I provide a milk ticket holder 1 which comprises a standard 2, attaching devices 3 and ticket gripping jaws 4. As here shown the milk ticket holder is constructed of three wires which are twisted together to form the standard 2 their lower portions being arranged radially as at 5 to span the mouth of a milk bottle and their terminals being downwardly turned as at 6 to form spring fingers to engage around the bead at the mouth of the milk bottle and thereby secure the holder thereon. The upper portions of two of the wires are bent reversely as at 7 to form the jaws 4 which enable a milk ticket such as is engaged at *a* to be placed and gripped between the jaws and securely held in place thereby, and also enable the ticket to be readily detached from the device as will be understood. The third wire has its upper end outwardly turned as at 8 to form a stop for the lower end of the protector 9.

The protector is here shown as of oblong rectangular form, open at the lower end and closed at the upper end and of sufficient size to enable it to be placed downwardly over the ticket and the holder, to cover the ticket and protector from the elements. When the protector is in place its lower end rests on the stop 8. The side walls of the protector have vertical central off-set portions 10 to receive the bent portions 7 of the ticket gripping jaws. At the upper end of the protector is a centrally arranged ring or eye 11 to enable the protector, holder and ticket to be hung from a nail or other suitable support when the holder is not in use on a bottle.

This improved device enables the milk ticket to be arranged conveniently for the milk man and so that the milk ticket can be readily punched by the milk man without necessity of removing the ticket from the holder. The cover or protector is to be used in wet weather. It serves to keep the milk ticket perfectly dry and in connection with the holder also serves to locate the ticket directly on the milk bottle.

Having thus described my invention, what I claim is:

A milk ticket holder comprising wires twisted together at a point intermediate with their ends to form a standard, the lower ends of the wires being arranged radially to span around a milk bottle mouth and being provided with downwardly turned portions to engage around the bead of the mouth, the upper portions of two of the wires being bent reversely to form ticket gripping jaws.

In testimony whereof I affix my signature.

FRANK L. SPEELMAN.